(12) United States Patent
Peng et al.

(10) Patent No.: US 8,988,830 B1
(45) Date of Patent: Mar. 24, 2015

(54) AIR BEARING DESIGN TO MITIGATE LUBE WATERFALL EFFECT

(71) Applicant: Western Digital (Fremont), LLC, Fremont, CA (US)

(72) Inventors: Jih-Ping Peng, Saratoga, CA (US); Biao Sun, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/893,188

(22) Filed: May 13, 2013

(51) Int. Cl.
G11B 5/60 (2006.01)
G11B 21/21 (2006.01)

(52) U.S. Cl.
CPC .................................. *G11B 21/21* (2013.01)
USPC ........................................................ 360/236.1

(58) Field of Classification Search
CPC ........... G11B 5/10; G11B 5/6005; G11B 5/40
USPC ........................................... 360/235.4–237.1
See application file for complete search history.

(56) References Cited

U.S. PATENT DOCUMENTS

| | | | |
|---|---|---|---|
| 6,075,673 A | 6/2000 | Wilde et al. |
| 6,097,575 A | 8/2000 | Trang et al. |
| 6,125,014 A | 9/2000 | Riedlin, Jr. |
| 6,125,015 A | 9/2000 | Carlson et al. |
| 6,130,863 A | 10/2000 | Wang et al. |
| 6,137,656 A | 10/2000 | Levi et al. |
| 6,144,528 A | 11/2000 | Anaya-Dufresne et al. |
| 6,147,838 A | 11/2000 | Chang et al. |
| 6,151,196 A | 11/2000 | Carlson et al. |
| 6,178,064 B1 | 1/2001 | Chang et al. |
| 6,181,522 B1 | 1/2001 | Carlson |
| 6,181,673 B1 | 1/2001 | Wilde et al. |
| 6,229,672 B1 | 5/2001 | Lee et al. |
| 6,236,543 B1 | 5/2001 | Han et al. |
| 6,246,547 B1 | 6/2001 | Bozorgi et al. |
| 6,249,404 B1 | 6/2001 | Doundakov et al. |
| 6,330,131 B1 | 12/2001 | Nepela et al. |
| 6,339,518 B1 | 1/2002 | Chang et al. |
| 6,349,017 B1 | 2/2002 | Schott |
| 6,373,660 B1 | 4/2002 | Lam et al. |
| 6,378,195 B1 | 4/2002 | Carlson |
| 6,522,504 B1 | 2/2003 | Casey |
| 6,538,850 B1 | 3/2003 | Hadian et al. |
| 6,583,953 B1 | 6/2003 | Han et al. |
| 6,584,676 B1 | 7/2003 | Chang et al. |
| 6,646,832 B2 | 11/2003 | Anaya-Dufresne et al. |
| 6,661,612 B1 | 12/2003 | Peng |
| 6,665,146 B2 | 12/2003 | Hawwa et al. |
| 6,690,545 B1 | 2/2004 | Chang et al. |
| 6,704,173 B1 | 3/2004 | Lam et al. |
| 6,708,389 B1 | 3/2004 | Carlson et al. |

(Continued)

OTHER PUBLICATIONS

B. Marchon, et al., "Lubricant Dynamics on a Slider: 'The Waterfall Effect'", Journal of Applied Physics 105, 074313, Apr. 7, 2009.

(Continued)

*Primary Examiner* — Angel Castro

(57) ABSTRACT

A slider comprises a slider trailing edge; a lubricant blocker having a disk facing surface and a lubricant blocker trailing edge, the lubricant blocker trailing edge having a lateral end trailing a central end; and a lubricant guiding channel recessed from the disk facing surface and extending from the slider trailing edge to the lubricant blocker trailing edge.

11 Claims, 3 Drawing Sheets

(56) References Cited

U.S. PATENT DOCUMENTS

| | | | |
|---|---|---|---|
| 6,717,773 B2 | 4/2004 | Hawwa et al. |
| 6,721,142 B1 | 4/2004 | Meyer et al. |
| 6,744,599 B1 | 6/2004 | Peng et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,856,489 B2 | 2/2005 | Hawwa et al. |
| 6,873,496 B1 | 3/2005 | Sun et al. |
| 6,912,103 B1 | 6/2005 | Peng et al. |
| 6,937,439 B1 | 8/2005 | Chang et al. |
| 6,956,718 B1 | 10/2005 | Kulkarni et al. |
| 6,972,930 B1 | 12/2005 | Tang et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,117 B1 | 8/2006 | Subrahmanyam et al. |
| 7,174,622 B2 | 2/2007 | Meyer et al. |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,526,856 B2 | 5/2009 | Nikitin |
| 7,593,190 B1 | 9/2009 | Thornton et al. |
| 7,595,963 B1 | 9/2009 | Chen et al. |
| 7,616,405 B2 | 11/2009 | Hu et al. |
| 7,719,795 B2 | 5/2010 | Hu et al. |
| 7,729,089 B1 | 6/2010 | Hogan |
| 7,855,854 B2 | 12/2010 | Hu et al. |
| 7,872,833 B2 | 1/2011 | Hu et al. |
| 7,916,426 B2 | 3/2011 | Hu et al. |
| 7,995,310 B1 | 8/2011 | Pan |
| 8,077,418 B1 | 12/2011 | Hu et al. |
| 8,081,400 B1 | 12/2011 | Hu |
| 8,087,973 B1 | 1/2012 | Sladek et al. |
| 8,089,730 B1 | 1/2012 | Pan et al. |
| 8,164,858 B1 | 4/2012 | Moravec et al. |
| 8,169,744 B2 | 5/2012 | Dorius |
| 8,174,794 B2 | 5/2012 | Dorius |
| 8,184,405 B1 * | 5/2012 | Zheng et al. ............... 360/266.3 |
| 8,199,437 B1 | 6/2012 | Sun et al. |
| 8,208,224 B1 | 6/2012 | Teo et al. |
| 8,218,268 B1 | 7/2012 | Pan |
| 8,240,545 B1 | 8/2012 | Wang et al. |
| 8,256,272 B1 | 9/2012 | Roajanasiri et al. |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,418,353 B1 | 4/2013 | Moravec et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,462,462 B1 | 6/2013 | Moravec et al. |
| 8,477,459 B1 | 7/2013 | Pan |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 2011/0303637 A1 | 12/2011 | Araki et al. |
| 2012/0045662 A1 | 2/2012 | Zou et al. |
| 2013/0244541 A1 | 9/2013 | Yaemglin et al. |
| 2013/0293982 A1 | 11/2013 | Huber |

OTHER PUBLICATIONS

W A. Challener, et al., "Heat-Assisted Magnetic Recording by a Near-Field Transducer With Efficient Optical Energy Transfer", www.nature.com/naturephotonics, Nature Photonics, vol. 3, Apr. 2009 (published online: Mar. 2009), pp. 220-224.

Jia-Yang Juang, et al., "Alternate Air Bearing Slider Designs for Areal Density of 1 Tb/in2", IEEE Transactions on Magnetics, vol. 42, No. 2, Feb. 2006, pp. 241-246.

B. Strom, et al., "Burnishing Heads In-Drive for Higher Density Recording", IEEE Transactions on Magnetics, vol. 40, No. 1, Jan. 2004, pp. 345-348.

Gurinder P. Singh, et al., "A Novel Wear-In-Pad Approach to Minimizing Spacing at the Head/Disk Interface", IEEE Transactions on Magnetics, vol. 40, No. 4, Jul. 2004, pp. 3148-3152.

\* cited by examiner

AIR BEARING DESIGN TO MITIGATE LUBE WATERFALL EFFECT

TECHNICAL FIELD

This disclosure relates to the field of magnetic recording and more specifically, to disk heads for hard disk drives.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

In a magnetic hard disk drive, the head typically comprises a body called a slider that carries a magnetic transducer on its trailing end. Examples of sliders are described in U.S. Pat. No. 7,872,833, filed Sep. 25, 2007, the contents of which is hereby incorporated by reference in its entirety. The magnetic transducer typically comprises a writer and a read element. The magnetic transducer's writer may be of a longitudinal or perpendicular design, and the read element of the magnetic transducer may be inductive or magnetoresistive. In a magnetic hard disk drive, the transducer is typically supported in very close proximity to the magnetic disk by a hydrodynamic air bearing. As the motor rotates the magnetic disk, the hydrodynamic air bearing is formed between an air bearing surface (ABS) of the slider of the head, and a surface of the magnetic disk. The thickness of the air bearing at the location of the transducer is commonly referred to as "flying height."

During operation, lubricant is present on the disk and can accumulate on the slider by evaporation or physical contact. During flight, the lubricant follows the shear stress field caused by airflow over the ABS. In some heads, lubricant blockers (for example, the trailing air flow dams described U.S. Pat. No. 7,872,833) extend to the trailing edge of the slider. The lubricant blockers block the majority of lubricant picked up by the ABS, but some lubricant climbs over the blocker and accumulates at the slider trailing end (i.e., the deposit end of the slider). When read/write operations are not occurring, the slider parks on a ramp. While parking on the ramp, the accumulated lubricant at the slider trailing end flows back to the ABS through diffusion. This "lubricant waterfall effect" affects drive recording performance when the head returns to the disk (i.e., is "reloaded") after extended flying followed by long parking. In particular, the lubricant waterfall effect undesirably increases the initial flying height. The head slowly returns to normal flight height after the lubricant moves back to the trailing end through air flow.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth to provide a thorough understanding of various embodiment of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

The terms "leading," and "trailing" refer to the direction of flight of the slider. The terms "inner" and "outer" refer to the disk radial direction when the slider is flying. The term "depth" refers to distance perpendicular to the plane of flight from the slider surface closest to the disk surface.

Figure 1:
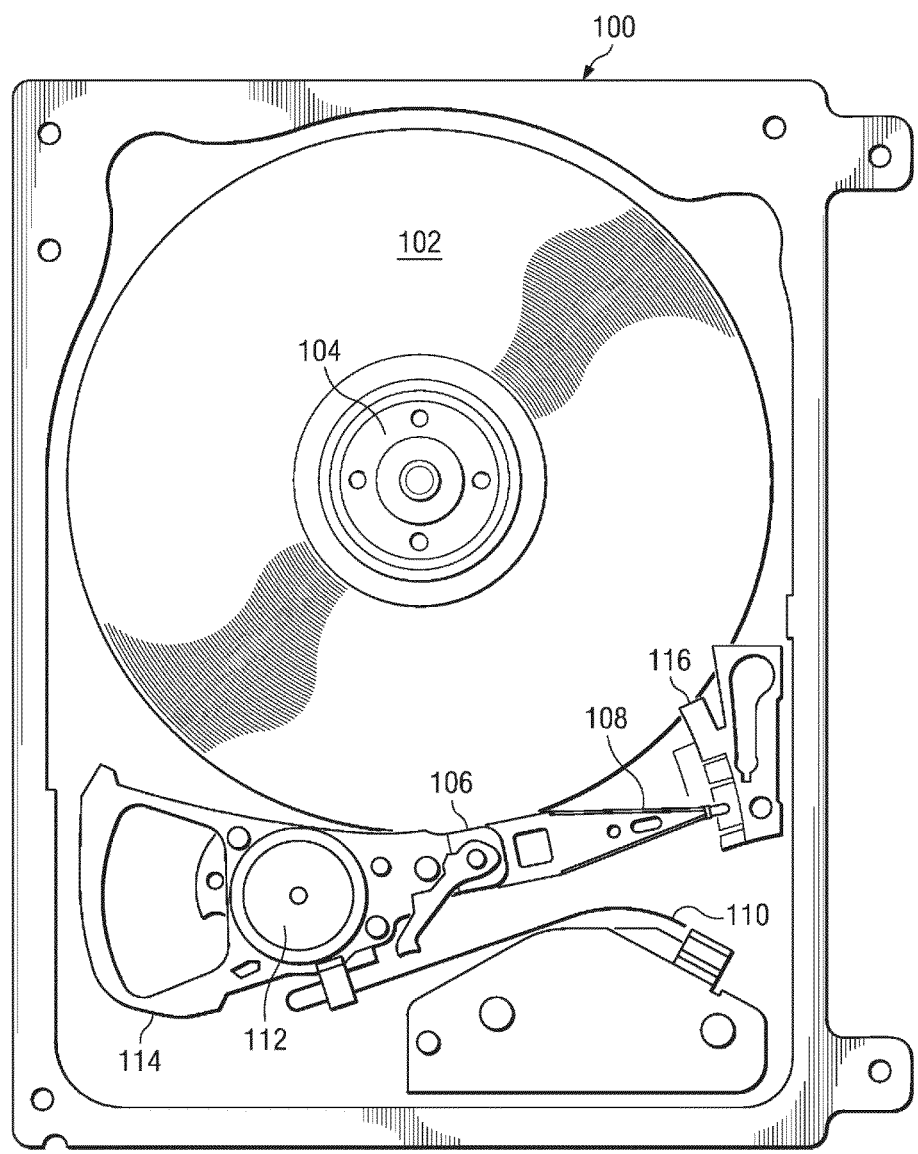
FIG. 1 illustrates an example head disk assembly.

The typical hard disk drive includes a head disk assembly (HDA) and a printed circuit board (PCB) attached to a disk drive base of the HDA. Referring now to FIG. 1, the head disk assembly 100 includes at least one disk 102, a spindle motor 104 for rotating the disk, a ramp 116, and a head stack assembly (HSA) 106. The spindle motor typically includes a rotating hub on which disks are mounted and clamped, a magnet attached to the hub, and a stator. Various coils of the stator are selectively energized to form an electromagnetic field that pulls/pushes on the magnet, thereby rotating the hub. Rotation of the spindle motor hub results in rotation of the mounted disks. The printed circuit board assembly includes electronics and firmware for controlling the rotation of the spindle motor and for controlling the position of the HSA, and for providing a data transfer channel between the disk drive and its host. The head stack assembly 106 typically includes an actuator, at least one head gimbal assembly (HGA) 108 that includes a head, and a flex cable assembly 110.

During operation of the disk drive, the actuator must rotate to position the head adjacent desired information tracks on the disk. The actuator includes a pivot bearing cartridge 112 to facilitate such rotational positioning. One or more actuator arms extend from the actuator body. An actuator coil 114 is supported by the actuator body opposite the actuator arms. The actuator coil is configured to interact with one or more fixed magnets in the HDA 100, typically a pair, to form a voice coil motor. The printed circuit board assembly provides and controls an electrical current that passes through the actuator coil and results in a torque being applied to the actuator. A crash stop is typically provided to limit rotation of the actuator in a given direction, and a latch is typically provided to prevent rotation of the actuator when the disk dive is not in use.

Figure 2:
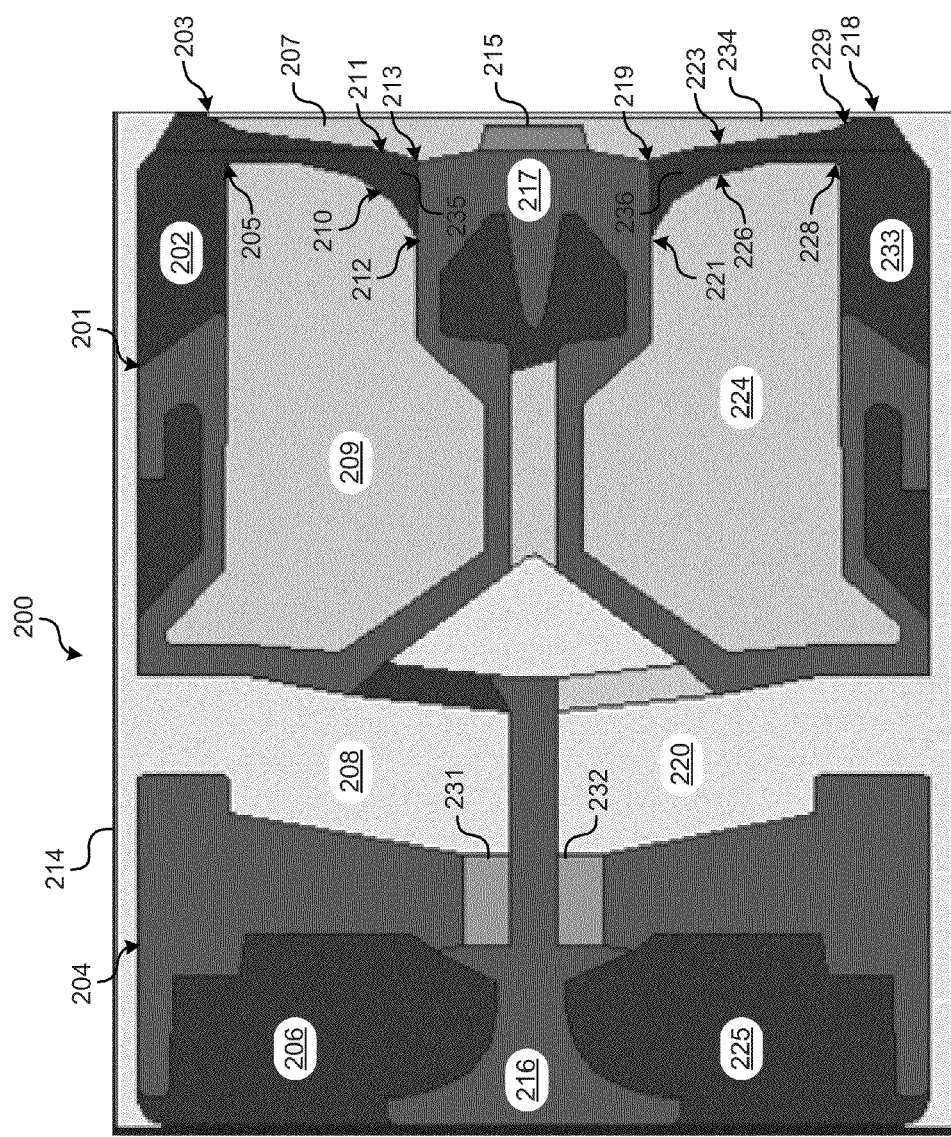
FIG. 2 illustrates a first example head.

Referring now to FIG. 2, a head 200 for a HGA 108 is illustrated. The head comprises a transducer 215 for at least reading information from the disk. In some embodiments, the transducer 215 is also for writing information to the disk. The transducer 215 may be a merged thin film magnetic transducer comprising an inductive writer and magnetoresistive read element. For example, the magnetoresistive element may comprise a giant magnetoresistive (GMR) element or a tunneling magnetoresistive (TMR) element. In particular implementation, the transducer 215 is a perpendicular magnetic recording (PMR) or energy assisted magnetic recording (EAMR) transducer.

The head 200 further comprises a slider 214. The slider 214 may be fabricated from a ceramic material such as alumina titanium carbide. Additionally, the slider 214 may have an overcoat, such as a carbon overcoat. The slider 214 has an air bearing surface (ABS) 204. In some implementations, the ABS 204 is formed by etching or milling the slider with a geometry defined by a mask.

In the illustrated geometry, the ABS 204 includes a leading pad 216 having a first pressurizing step 225 and a second pressurizing step 206. During flight, the pressurizing steps 225 and 206 may help develop super-ambient pressure between the leading pad 216 and the disk surface.

Two shallow cavities 231, 232 trail the leading pad 216. The shallow cavities 231, 232 can develop a sub-ambient pressure region between the ABS 204 and the disk surface. Shallow cavities 231, 232 are shallower than pressurizing steps 206, 225. The sub-ambient pressure may reduce flying height sensitivities to changes in altitude and air bearing geometries.

Two deep cavities 208, 220 trail the leading pad 216 and shallow cavities 231, 232. A trailing pad structure 201 trails the deep cavities 208, 220. The trailing pad structure includes a trailing pad 217. The transducer 215 is deposited on the trailing face of the trailing pad 217.

Two sub-ambient pressure cavities 209 and 224 are adjacent to the trailing pad 217. During operation, the sub-ambient pressure cavities 209 and 224 may develop sub-ambient pressure, shifting the effective center of net sub-ambient pressure rearward. During flight, this shift may facilitate dynamically separating the slider from the disk surface. Sub-ambient pressure cavities 209 and 224 are deeper than pressurizing steps 206, 225 but shallower than deep cavities 208, 220.

Two lubricant blockers 235, 236 are proximal to the trailing edge 218 of slider 214. Each lubricant blocker 235, 236 has a central end adjacent to the trailing pad 217 and a lateral end adjacent to respective side trailing pads 202, 233. The lubricant blockers 235, 235 are slanted, such that the central ends lead the lateral ends. The portion of the slider 214 trailing the lubricant blockers 235, 236 defines two lubricant guiding channels 207, 234 that are recessed from the disk facing surface of trailing pad 217.

The lubricant guiding channels 207, 234 extend from the trailing face 218 of the slider 214 to trailing edges 211, 223 of the lubricant blockers 235, 236. Because of the slanted contours of the trailing edges 211, 223, the channels 207, 234 taper from their widest at their central ends to points at their lateral ends.

During flight, lubricant picked up by the lubricant blockers 235, 236 migrates by shear forces onto the trailing edges 211, 223 and lubricant guiding channels 207, 234. During flight, the lubricant follows the contours 211, 223 and accumulates at the lateral trailing corners 203, 229 of the slider 214. Accordingly, when the slider 214 is resting on the ramp (FIG. 1, 116), the lubricant takes much longer to diffuse back to the gap area between transducer 215 and the disk surface than would be the case in a slider lacking channels 207, 234 and having a lubricant blocker that is coplanar with the trailing edge 218. Additionally, when lubricant does diffuse to the gap area, the lubricant thickness on the transducer 215 is thinner because the thickness is inversely proportional to the square of the diffusion distance.

The lubricant blockers 235, 236 further comprise leading edges 210, 226. In the illustrated embodiment, the leading edges 210, 226 are also slanted, with central ends 212, 221 trailing lateral edges 205, 228. The central edges 212 and 221 meet the lateral sides of the trailing pad 217. During flight, lubricant on the leading faces 210, 226 may be pushed towards the lateral edges of the slider 214. This may reduce the lubricant waterfall effect on the leading faces 210, 226.

The lubricant blockers 235, 226 may have straight or curved leading edges 210, 226 and may have straight or curved trailing edges 211, 223.

In some implementations, lubricant blockers 235, 236 are symmetrical about the (leading-trailing) central axis of the slider 214. In other embodiments, the lubricant blockers 235, 236 may have different shapes. For example, the lubricant blockers 325, 236 may have slightly different shapes to accommodate different forces on the inner diameter side of the slider 214 as compared to the outer diameter side of the slider 214.

The central ends meet the trailing pad 217 at two trailing locations 213, 219 and two leading locations 212, 221. In some embodiments, the central trailing locations 213, 219 are adjacent to two trailing corners of the trailing pad 217. The angle at the central trailing locations 213, 219 may be greater than or equal to 1° and less than or equal to 30° with respect to a line perpendicular to the trailing edge 218. In some cases, the angle at the central trailing locations 213, 219 may be greater than or equal to 10° and less than or equal to 25°. In a particular embodiment, the angle is 18.6°.

The lateral leading ends 212, 221 meet the lateral sides of the trailing pad 217 at an angle. In some embodiments, the angle at the leading locations 212, 221 is greater than or equal to 1° and less than or equal to 75° with respect to a line perpendicular to the trailing edge 218. In some cases, the angle at the leading locations 212, 221 is greater than or equal to 30° and less than or equal to 65° with respect to a line perpendicular to the trailing edge 218. In a particular embodiment, the angle is 58.5°.

In some embodiments, the lateral trailing edge ends 203, 229 coincide with the slider trailing edge 218. The lateral trailing ends 203, 229 may meet the slider trailing edge 218 at an angle greater than or equal to 1° and less than or equal to 45° with respect to the trailing edge 218. In some cases, the angle at the lateral trailing ends 203, 229 is between 15° and 35°. In a particular embodiment, the angle is 26.8°.

The lateral leading ends 205, 228 meet the inner sides of the side pads 202, 233, at an angle. The lateral leading ends 205, 228 may meet the side pads 203, 233 at an angle greater than or equal to 0° and less than or equal to 30° with respect to a line perpendicular to the trailing edge 218. In a particular embodiment, the angle is 0°.

The disk facing surfaces of the lubricant blockers 235, 236 may be recessed from the surface of trailing pad 217 and transducer 215. For example, the disk facing surfaces of the lubricant blockers 235, 236 may be etched to the same depth as pressurizing steps 206, 225, 202, and 233. This may reduce the number of masks needed for manufacturing the slider 214. However, in other embodiments, the etch depth of the lubricant blockers 235, 236 may be deeper or shallower than the pressurizing steps. For example, the lubricant blockers 235, 236 may have disk facing surfaces 0.1 to 0.5 microns lower than the disk facing surfaces of trailing pad 217 and transducer 215.

The lubricant guiding channels 207, 234 may be recessed from the disk facing surfaces of the trailing pad 217, transducer 215, and lubricant blockers 235, 236. For example, the lubricant guiding channels 207, 234 may be etched to the same depth as cavities 209, 224. However, in other embodiments, the etch depth of the lubricant guiding channels 207, 234 may be deeper or shallower than the cavities 209, 224. For example, the lubricant guiding channels 207, 234 may have disk facing surfaces 1.5 microns lower than the disk facing surfaces of trailing pad 217 and transducer 215.

The thickness (distance from leading edge to trailing edge) of the lubricant blockers 235, 236 may be uniform or non-uniform along the lengths of the blockers 235, 236. In some embodiments, the blocker 235, 236 thicknesses vary between 20 to 100 microns. In some embodiments, due to manufacturing restrictions, the lubricant blockers 235, 236 may vary between 25 to 100 microns. In a particular embodiment, the lubricant blockers 235, 236 are 30 microns at their narrowest.

Due to their taper, the thicknesses of the lubricant guiding channels 207, 234 vary along their lengths. In various embodiments, the channels 207, 234 may taper at a uniform (for straight trailing contours 211, 233) or non-uniform or even non-monotonic rate (for curved trailing contours 211, 233). In some embodiments, the channels 207, 234 are thickest at the locations 213, 219 where the trailing edges 211, 223 meet the trailing pad 217. In various embodiments, the channels 207, 234 may be between 3 microns and 100 microns at their thickest. In a particular embodiment, the channels 207, 234 are 40 microns at their thickest.

Figure 3:
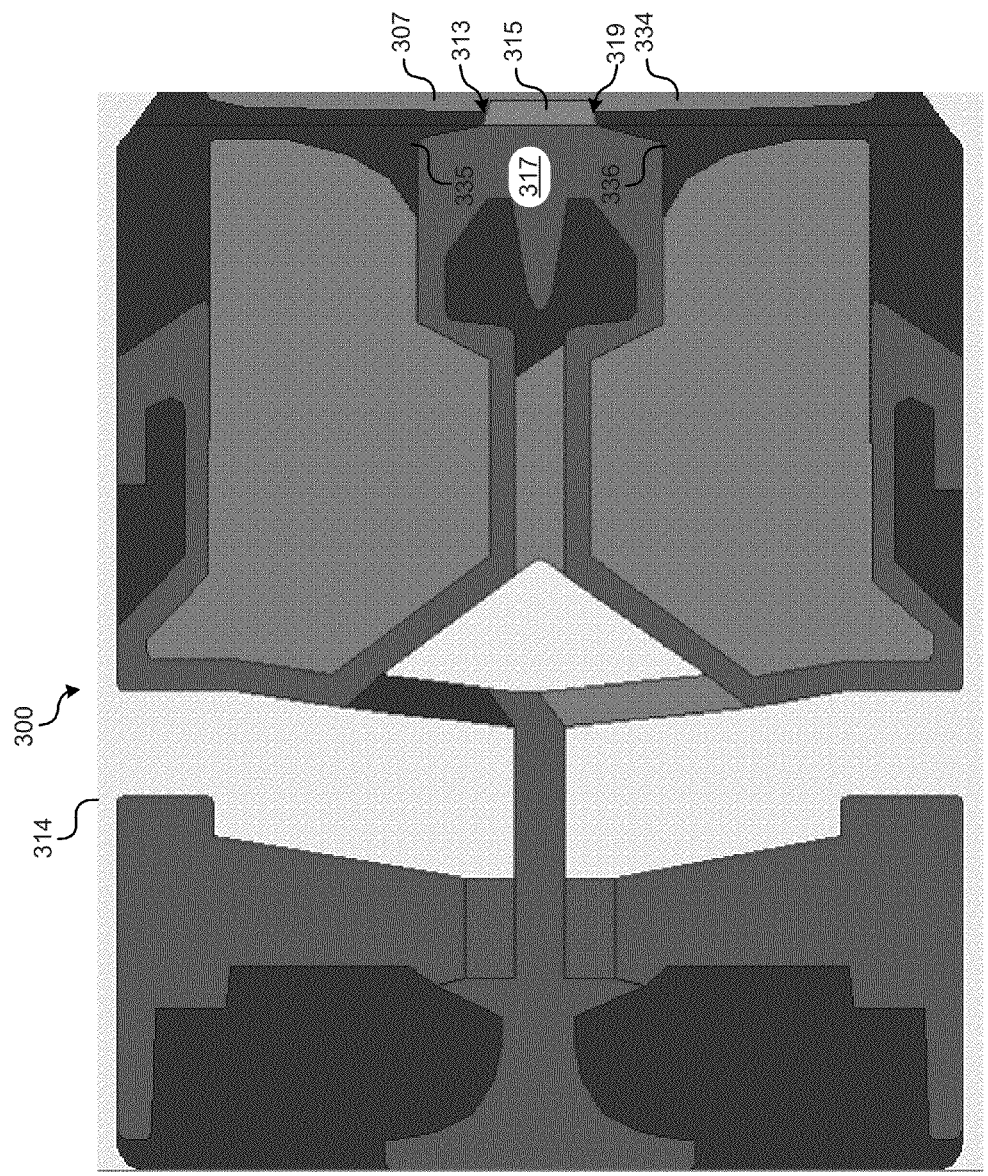
FIG. 3 illustrates a second example head.

FIG. 3 illustrates a head 300 comprising a slider 314. Slider 314 differs from slider 214 in that the central trailing ends 313, 319 of lubricant blockers 335, 336 meet the lateral edges of transducer 315. In this embodiment, the trailing central ends 313, 319 meet the transducer 315 at shallower angles than trailing central ends 213 219. In some embodiments, the angle may be between 0.5° and 10° or between 0.5° and 5°. In a particular embodiment, the angle is 0.9°. Additionally, in this embodiment, the channels 307, 334 are thinner than the channels 207, 234. For example, in a particular embodiment, the channels 307, 334 are 18 microns at their thickest. Other aspects of the geometry of slider 314 are the same as slider 214 of FIG. 2.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A slider, comprising:
    a slider trailing edge;
    a lubricant blocker having a disk facing surface and a lubricant blocker trailing edge, the lubricant blocker trailing edge having a lateral end trailing a central end; and
    a lubricant guiding channel recessed from the disk facing surface and extending from the slider trailing edge to the lubricant blocker trailing edge;
    wherein the lubricant blocker has a lubricant blocker leading edge, the lubricant blocker leading edge having a leading edge lateral end trailing a leading edge central end;
    wherein, at the leading edge central end, the lubricant blocker leading edge is angled between 1° and 75° with respect to a line parallel to the slider trailing edge.

2. The slider of claim 1, further comprising:
    a second lubricant blocker having a second disk facing surface and a second lubricant blocker trailing edge, the second lubricant blocker trailing edge having a second lateral end trailing a second central end; and
    a second lubricant guiding channel recessed from the second disk facing surface and extending from the slider trailing edge to the second lubricant blocker trailing edge.

3. The slider of claim 2, wherein the first lubricant blocker and the second lubricant blocker are symmetrically disposed about a central axis of the slider.

4. The slider of claim 1, wherein the central end is adjacent to a transducer region of the slider.

5. The slider of claim 1, wherein the central end is adjacent to a center trailing pad of the slider.

6. The slider of claim 1, wherein at the lateral end, the lubricant blocker trailing edge is angled between 1° and 45° with respect to a line parallel to the slider trailing edge.

7. A slider, comprising:
    an air bearing surface;
    an air bearing surface center trailing edge; and
    a means for directing lubricant away from the air bearing surface central trailing edge while the slider is flying;
    wherein the means for directing lubricant away from the air bearing surface central trailing edge while the slider is flying comprises a lubricant blocker having a lubricant blocker leading edge, the lubricant blocker leading edge having a leading edge lateral end trailing a leading edge central end;
    wherein, at the leading edge central end, the lubricant blocker leading edge is angled between 1° and 75° with respect to a line parallel to the slider trailing edge.

8. The slider of claim 7, wherein the means for directing lubricant away from the air bearing surface central trailing edge while the slider is flying further comprises a lubricant blocker trailing edge having a lateral end trailing a central end.

9. The slider of claim 8, wherein the central end is adjacent to a transducer region of the slider.

10. The slider of claim 8, wherein the central end is adjacent to a center trailing pad of the slider.

11. The slider of claim 7, wherein the means for directing lubricant away from the air bearing surface central trailing edge while the slider is flying further comprises a lubricant guiding channel.

* * * * *